No. 11,809.

Reissued Feb. 20, 1900.

T. W. COUGHLIN.

HEAD REST FOR CASKETS.

(Application filed Dec. 18, 1899.)

WITNESSES:
Geo. B. Rowley.
H. J. Lieck

INVENTOR
Thomas W. Coughlin

BY
Seymour Seymour & Norris
his ATTORNEYS

THE NORRIS PETERS CO., PHOTO-LITHO., WASHINGTON, D. C.

UNITED STATES PATENT OFFICE.

THOMAS W. COUGHLIN, OF BINGHAMTON, NEW YORK.

HEAD-REST FOR CASKETS.

SPECIFICATION forming part of Reissued Letters Patent No. 11,809, dated February 20, 1900.

Original No. 628,649, dated July 11, 1899. Application for reissue filed December 18, 1899. Serial No. 740,821.

*To all whom it may concern:*

Be it known that I, THOMAS W. COUGHLIN, a citizen of the United States, residing at Binghamton, in the county of Broome and State of New York, have invented certain new and useful Improvements in Head-Rests for Caskets, of which the following is a specification.

My invention relates to improvements in head-rests for caskets; and the object of my improvements is to provide a head-rest by which the head and shoulders of a body can be raised and lowered readily. I attain this object by means of the mechanism illustrated in the accompanying drawings, in which—

Figure 1:
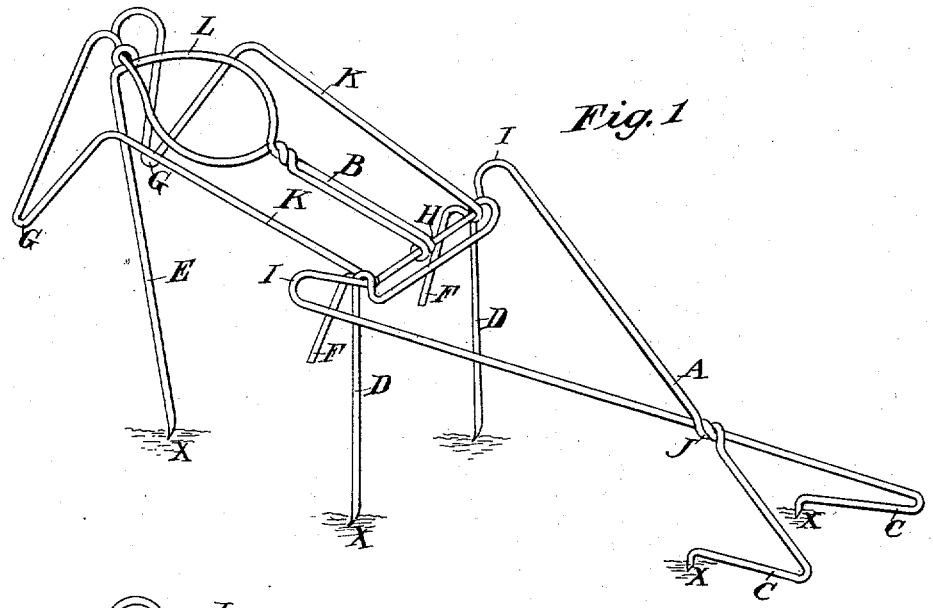
Figure 2:
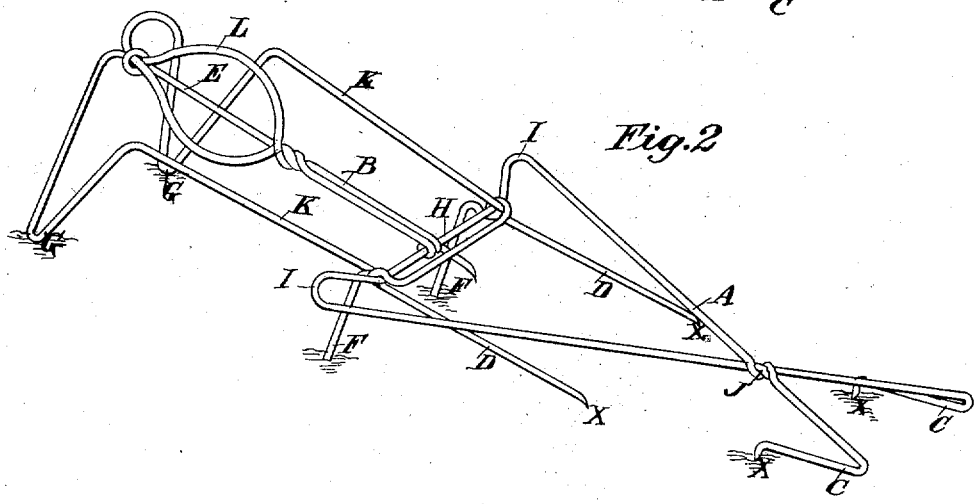

Figure 1 is a perspective view of my head-rest in an elevated position, and Fig. 2 is a similar view of it lowered to its lowest plane.

In Fig. 1, A represents the main body of my rest; B, the head-rest proper; C, the lower supporting-legs; D, the middle supporting-legs; E, the higher supporting-leg; F, the middle auxiliary legs; G, the higher auxiliary leg; H, the cross-rod; I, the ears; J, the twisted center; K, the upper extension; L, the head-ring, and X the toes of the legs. In Fig. 2 the same letters indicate the same parts.

My support is made of stiff wire, which is twisted into the form desired and the different parts connected. The main body A is composed of a wire bent in the form of an elongated X, the top of which is continuous, forming the straight horizontal cross-bar H between the two sides, which extend upward in the two open loops I. The wire then crosses itself about the center J, where it is intertwisted and ends in the two legs C, bent under and backward and provided with the sharp toes X. Around the outward ends of the cross-bar H are twisted the two ends of the extension K, the ends extending downward to form the legs F and the upper part of which drops to form the auxiliary legs G and then, meeting in the center, extend to form the ring L, below which the two wires are intertwisted and run together in the neck B to the center of the rod H, around which they are immovably clamped. The leg E is simply a straight rod secured movably at one end to the ring L and having the sharp toes X. The legs D are made of a continuous wire bent at right angles, the top of which is bent around the rod H, to which it is movably clamped. When in the position indicated in Fig. 1, a body placed upon it is raised up in a casket, and when it is desired to lower it the legs D and E are pushed forward and the support is lowered till it rests upon the auxiliary legs F and G.

It will be observed that my improved head-rest is entirely separate from the casket and can be used with any casket, as it is not permanently attached to the casket itself. It will be observed that the legs F and G support the frame at a certain predetermined inclination, and if it is necessary or desirable to incline the frame at a greater angle it is accomplished by simply lifting the frame and body, whereupon the legs D and E will automatically maintain the body at the elevation to which it is raised, as they being in contact with the bottom of the casket and the points being made to engage the bottom of said casket will so engage when the weight of the body is borne by the frame, the frame being kept from endwise movement by the legs C, having the sharpened points.

I thus provide a very simple and inexpensive device to be used with any casket and which will permit of almost any amount of adjustment necessary for the purpose.

What I claim, and desire to secure by Letters Patent, is—

1. A rest for caskets consisting of a frame separate from the casket, means carried by said frame for supporting it at a certain predetermined inclination, other means carried by the frame for supporting it at different angles of inclination, and means also carried by the frame for preventing endwise movement, substantially as described.

2. A rest for caskets consisting of a frame, legs pivoted on said frame at different portions in the length thereof for supporting it at different angles, and means also carried by the frame for preventing endwise movement, substantially as described.

3. A rest for caskets consisting of a frame separate from the casket, said frame having movable supporting-legs adapted to engage the bottom of the casket and support the frame at different angles of inclination, and other means wholly carried by the frame for preventing endwise movement, substantially as described.

4. In a head-rest for caskets, the frame A provided with the legs C, the ears I, and the rod H in combination with the extension-frame K provided with the auxiliary legs F and G, and the ring L; and the legs D and E; as described and specified.

5. In a head-rest for caskets, a wire frame made to support the body at a desired angle by means of movable vertical legs of different lengths located in different parts of the frame and provided with sharpened points to prevent their slipping on the bottom of the casket; in combination with a rigid wire frame having sharpened points at its lower extremities to engage the bottom of the casket, and relatively-short auxiliary rigid legs at its upper end to support it when let down, at a slight angle above the casket-bottom; said frame at its upper end being shaped to receive and hold the head, the lower part spreading out laterally to support the shoulders, the lower end narrowing; the head-frame and the body-frame being rigidly connected as described and specified.

Signed at Binghamton, in the county of Broome and State of New York, this 12th day of December, 1899.

THOMAS W. COUGHLIN.

Witnesses:
WM. H. DONLEY,
EDWARD T. LYNCH.